United States Patent [19]
Wefers et al.

[11] Patent Number: 5,132,181
[45] Date of Patent: Jul. 21, 1992

[54] PHOSPHONIC/PHOSPHINIC ACID BONDED TO ALUMINUM HYDROXIDE LAYER

[75] Inventors: Karl Wefers, Apollo; Gary A. Nitowski, Natrona; Larry F. Wieserman, Apollo, all of Pa.

[73] Assignee: Aluminum Company of America, Pittsburgh, Pa.

[21] Appl. No.: 624,793

[22] Filed: Dec. 10, 1990

Related U.S. Application Data

[62] Division of Ser. No. 397,264, Aug. 23, 1989, Pat. No. 5,059,258.

[51] Int. Cl.$^5$ .............................. B32B 15/04
[52] U.S. Cl. ........................ 428/457; 428/469; 430/278; 502/401; 502/414
[58] Field of Search ............ 428/457, 469; 430/278; 204/33, 38; 502/401, 414

[56] References Cited

U.S. PATENT DOCUMENTS
4,994,429  2/1991  Wieserman et al. .............. 502/401

Primary Examiner—Merrell C. Cashion, Jr.
Assistant Examiner—Hoa Thi Le
Attorney, Agent, or Firm—Andrew Alexander

[57] ABSTRACT

Disclosed is a method of producing a functionalized layer and an aluminum hydroxide layer on an aluminum substrate, the aluminum hydroxide layer located between the substrate and the functionalized layer. The method comprises the steps of subjecting an aluminum substrate to a hydrothermal treatment in an aqueous solution having a pH in the range of 2 to 14 to form a layer of aluminum hydroxide on said substrate and thereafter treating said aluminum substrate with a phosphorus-containing acid selected from phosphinic and phosphonic acid to form a functionalized layer on said aluminum hydroxide layer, the functionalized layer comprised of the reaction product of said acid and the layer of aluminum hydroxide.

33 Claims, 2 Drawing Sheets

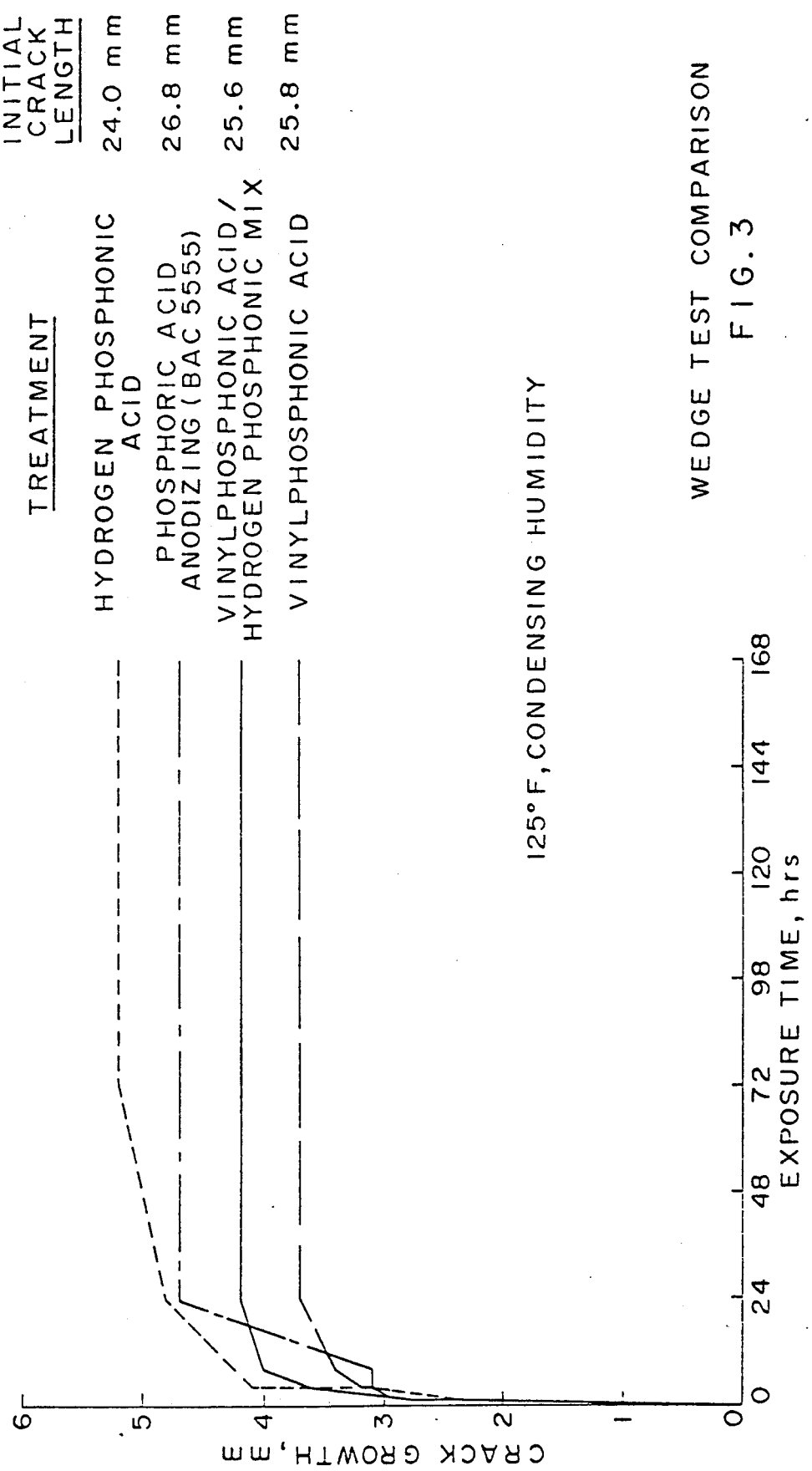

PHOSPHONIC/PHOSPHINIC ACID BONDED TO ALUMINUM HYDROXIDE LAYER

This application is a division of application Ser. No. 07/397,264, filed Aug. 23, 1989, now U.S. Pat. No. 5,059,258.

BACKGROUND OF THE INVENTION

1. Field of the Invention

This invention relates to a process for forming a duplex coating on the surface of an aluminum substrate such as sheet. More particularly, this invention relates to a protective coating on aluminum which comprises an aluminum hydroxide layer on the metal surface and a functionalized layer of phosphonic/phosphinic acid chemically bonded to the hydroxide layer.

2. Description of the Related Art

It is well known that the natural oxide on aluminum can be reinforced or altered by several treatment methods to give better protection against corrosion or serve as a substrate for adhesive bonding. Such treatments include anodic oxidation, hydrothermal treatment in water, water vapor or aqueous solutions, or reaction treatments such as conversion coatings which employ solutions which may contain chromic acid, chromates, phosphoric acid, phosphates and fluorides.

While anodic oxides can be grown to thicknesses of tens of microns, their application is generally time consuming and requires expensive electrical equipment. Hydrothermal coatings are easier and faster to apply and require only simple equipment. They consist mostly of AlOOH or Al(OH)$_3$ in crystalline or amorphous (gelatinous) form and are generally known as boehmite coatings as disclosed in Wernick et al, "The Surface Treatment and Finishing of Aluminum and Its Alloys", ATM Publ., 1987. These coatings offer reasonably good protection in mildly aggressive environments. Chemical conversion coatings, e.g., Alodine coatings as disclosed in Wernick et al, can be applied in several seconds to a few minutes. They afford good corrosion protection and are good bonding substrates for polymer coatings, laminates or adhesives although they do not match the adhesion and durability performance of anodic oxides applied in phosphoric acid according to U.S. Pat. No. 4,085,012. Their disadvantage is their content of Cr-VI (chromate) compounds which require costly disposal of residues (sludge).

Venables et al, U.S. Pat. No. 4,308,079, teach the treatment of an aluminum oxide surface of an aluminum substrate with a partial monomolecular layer of an amino phosphonate compound such as nitrilotris (methylene) triphosphonic acid to retard hydration of the aluminum oxide to aluminum hydroxide to provide a more stable microporous surface which is particularly suited to commercial adhesives. The formation of the hydrated oxide is said to interfere with the stability of a satisfactory bond between the adhesive and the oxide, while the phosphonate treatment to form a partial monomolecular layer is said to be sufficient to inhibit the conversion of the oxide to hydroxide without interfering with subsequent bonding of the adhesive to the oxide.

In the present invention, it has been discovered that a duplex coating can be applied to a metal surface. The coating comprises a layer of metal hydroxide, e.g., aluminum hydroxide, and a layer which is comprised of the reaction product of phosphonic or phosphinic acids such as monomeric or polymeric acids.

SUMMARY OF THE INVENTION

Disclosed is a method of producing an aluminum hydroxide layer and a functionalized layer on an aluminum substrate, the aluminum hydroxide layer located between the substrate and the functionalized layer. The method comprises the steps of subjecting an aluminum substrate to a hydrothermal treatment in an aqueous solution having a pH in the range of 2 to 14 to form a layer of aluminum hydroxide on said substrate and thereafter treating said aluminum substrate with a phosphorus-containing acid selected from phosphinic and phosphonic acid to form a functionalized layer on said aluminum hydroxide layer, the functionalized layer comprised of the reaction product of said acid and the layer of aluminum hydroxide.

It is, therefore, an object of this invention to provide a process for forming a functionalized coating on the surface of an aluminum substrate which comprises a first layer of an aluminum hydroxide and a second layer comprised of a reaction product of phosphonic acid, phosphinic acid, or a combination of such acids with the aluminum hydroxide.

It is another object of this invention to provide a process for forming a functionalized coating on the surface of a metal such as aluminum which comprises a first layer of an aluminum hydroxide on the surface of the aluminum and a second layer of phosphonate or phosphinate, or a combination thereof, the aluminum hydroxide formed by subjecting the surface to a hydrothermal treatment, e.g., in an aqueous solution, at a pH in the range of 2–14 to form aluminum hydroxide.

These and other objects of the invention will be understood from the following description and accompanying flow sheet.

BRIEF DESCRIPTION OF THE DRAWINGS

FIG. 3 shows the results of wedge tests (ASTM D3762-79) on specimens treated in accordance with the invention.

DETAILED DESCRIPTION OF THE INVENTION

Figure 1:
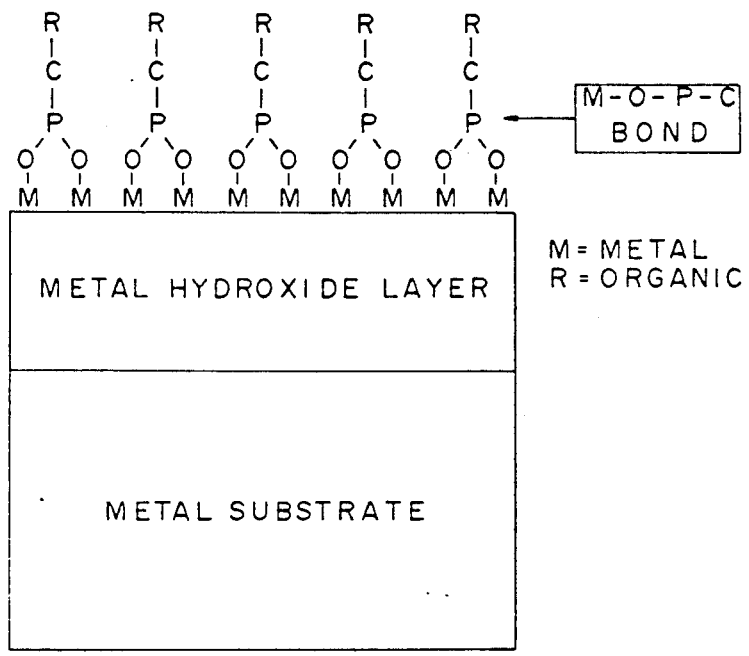
FIG. 1 illustrates the R groups in the functionalized layer extending away from the hydroxylated surface.

In accordance with the invention, the aluminum is treated to form an aluminum hydroxide coating thereon. Bonded to the hydroxide coating is a layer consisting essentially of a reaction product of a phosphorus-containing organic acid selected from the class consisting of phosphonic acid, phosphinic acid, or a combination of these acids, referred to herein as a functionalized layer. The acids may be polymeric or monomeric. The reaction product, e.g., phosphonate or phosphinate, in accordance with the invention exhibits a preferred orientation such that the phosphorus groups are bonded to the aluminum hydroxide on the surface while the R groups extend away from that surface, as illustrated in FIG. 1.

By polymer as used herein is meant a macromolecule formed by the chemical union of five or more combining units which may be the same or different monomers, dimers, trimers, etc.

Functionalized layer as used herein means a layer which can have a chemical reactivity ranging from non-reactive to very reactive and which can be acid and base resistant, exhibit hydrophobicity or hydrophilicity, can be thermally stable at 250° C., for example, and be hydration resistant.

By hydration resistant coating is meant the functionalized layer of phosphonate/phosphinate bonded to a nonporous coating of substantially metal hydroxide such as aluminum hydroxide.

By aluminum hydroxide as used herein is meant to include aluminum hydroxide and aluminum hydroxide in combination with aluminum oxides.

Phosphonic acid as used herein has the formula:

$R_m[PO(OH)_2]_n$ wherein R may be hydrogen or is one or more radicals having a total of 1-30 carbons; m is the number of radicals in the molecule and is in the range of 1-10; n is the number of phosphonic acid groups in the molecule and is in the range of 1-10.

Phosphinic acid as used herein has the formula:

$R_mR'_o[PO(OH)]_n$ wherein R may be hydrogen or is one or more radicals having a total of 1-30 carbons; m is the number of R radicals in the molecule and is in the range of 1-10; R' may be hydrogen or may be comprised of 1-30 carbon-containing radicals; o is the number of R' radicals and is in the range of 1-10; n is the number of phosphinic acid groups in the molecule and is in the range of 1-10.

Phosphonic or phosphinic acid as used herein may include monomeric and polymeric phosphonic or phosphinic acids and such compounds which can form acid radicals in solution.

The metal product to be treated may be in the form of foil, sheet, plate, extrusion, tube, rod or bar. The metal may comprise aluminum, niobium, tantalum, titanium, zinc, copper, iron or zirconium. The use of specific metals, e.g., aluminum, herein is meant to include alloys thereof, such as aluminum alloys having 99 wt. % purity, or aluminum alloys containing 0.05 to 1.8 wt. % Mn, max. 1.3 wt. % Mg, and an aluminum alloy containing 0 to 1.4 wt. % Mn, 0.5 to 5.5 wt. % Mg.

It will, therefore, be understood that the use of the term aluminum surface herein is intended to include all such aluminum materials and shapes.

In accordance with the invention, the aluminum product is subjected to a hydroxylating treatment. That is, the product is treated with water, water-containing vapor, e.g., steam, or an aqueous solution having a pH in the range of 2 to 12, preferably a pH in the range of 7 to 10. This treatment forms a layer of aluminum hydroxide on the surface of the aluminum product; aluminum hydroxide may have the formula AlOOH or Al(OH)$_3$ or nonstoichiometric versions thereof and can include partially hydroxylated oxide layers, depending somewhat on the temperature of the solution. For example, while the treatment temperature of the solution can range from room temperature to about 200° C., temperatures of 70° to 200° C. tend to favor formation of AlOOH, and room temperature to about 70° C. tend to favor formation of of Al(OH)$_3$. The layer of aluminum hydroxide is less than 5000Å and preferably less than 1000Å with typical thicknesses being in the range of 100 to 950Å.

While treatment with water vapor at temperatures above 100° C. provides very fast hydroxylation, the need for pressure vessels makes this approach less desirable. Sufficient hydroxylation within seconds can also be achieved by the use of mildly alkaline solutions of pH of 8-10 at temperatures near boiling.

Aqueous solutions suitable for use in providing a hydroxylated surface can be water combined with a basic material which may be organic or inorganic. Suitable basic materials which may be used include organic amines, e.g., triethanol amine, propyl amine, triethyl amine, alkali metal hydroxides, alkaline earth metal hydroxides, ammonium hydroxide and alkali metal carbonates or bicarbonates. It will be appreciated that the hydrolysis of acid salts also will result in the formation of the hydroxylated surface, e.g., treatment of an aluminum surface with water after it has been treated or immersed in an inorganic oxy acid, e.g., $H_2SO_4$ acid. To prepare the solution, a sufficient amount of the basic material is added to water to adjust the pH to the desired level.

Time of treatment can be as short as one second. Treatment times can range from 1 to 100 seconds or longer, e.g., 5 to 10 minutes, with preferred times being 1 to 30 seconds, and typical times being in the range of 5 to 10 seconds.

After hydroxylating, the aluminum is treated in a solution of phosphonic or phosphinic acid, either monomeric or polymeric, or a combination of such acids.

The solution or liquid used in the treatment of the aluminum surface preferably comprises a solvent, e.g., water, alcohol or organic solvents, with a range of concentration of from about 0.001 molar to a saturated solution, preferably about 0.1 to about 2 molar, of a 1-30 carbon, preferably 2-12 carbon, phosphonic acids; one or more 1-30 carbon, preferably 2-12 carbon, phosphinic acids; or a mixture of the same. The acids may be monomeric or polymeric. The solution may be sprayed or immersed. The metal is treated by contacting the surface of the solution, which contacting can include the preferred methods of spraying or immersing.

Examples of groups which may comprise R and/or R' include long and short chain aliphatic hydrocarbons, aromatic hydrocarbons, carboxylic acids, aldehydes, ketones, amines, amides, thioamides, imides, lactams, anilines, pyridines, piperidines, carbohydrates, esters, lactones, ethers, alkenes, alkynes, alcohols, nitriles, oximes, organosilicones, ureas, thioureas, perfluoro organic groups, silanes and combinations of these groups.

Representative of the polymeric phosphonic acids are as follows: polyvinyl phosphonic acid, poly(vinylbenzyl)phosphonic acid, poly(2-propene)phosphonic acid, phosphonomethyl ethers of cellulose, phosphonomethyl ethers of polyvinl alcohol, poly 2-butene phosphonic acid, poly 3-butene phosphonic acid, phosphonomethyl ethers of starch, polystyrene phosphonic acid, polybutadiene phosphonic acid and polyethylene imine methyl phosphonate.

Representative of the monomeric phosphonic/phosphinic acids are as follows: amino trismethylene phosphonic acid, aminobenzylphosphonic acid, phosphomycin, 3-amino propyl phosphonic acid, 0-aminophenyl phosphonic acid, 4-methoxyphenyl phosphonic acid, aminophenylphosphonic acid, aminophosphonobutyric acid, aminopropylphosphonic acid, benzhydrylphosphonic acid, benzylphosphonic acid, butylphosphonic acid, carboxyethylphosphonic acid, diphenylphosphinic acid, dodecylphosphonic acid, ethylidenediphosphonic acid, ethylphosphonic acid, heptadecylphosphonic acid, hydrogen phosphonic acid, methylbenzlyphosphonic acid, methylphosphonic acid, naphthylmethylphosphonic acid, octadecylphosphonic acid, octylphosphonic acid, pentylphosphonic acid, phenylphosphinic acid, phenylphosphonic acid, phosphonopropionic acid, phthalide-3-phosphonic acid, bis-(perfluoroheptyl) phosphinic acid, perfluorohexyl phosphonic acid and styrene phosphonic acid.

The phosphonic/phosphinic acid molecules such as listed above may also include inorganic groups substituted thereon such as phosphates, and the like, or groups such as phosphonates, sulfonates, or carbonates. While it is preferred that the free end of the organic group extends away from the aluminum oxide/hydroxide surface, it is within the scope of the present invention to provide, on the free end of the molecule, functional groups. The term functional group may be defined as the group on the molecule which enables the phosphonic/phosphinic acid molecule bonded to the aluminum oxide surface to react with, repel, attract, couple to, or bond with, etc., other atoms, ions and/or molecules. By attaching specific functional groups, either organic or inorganic, to the R and R' groups of the phosphonic and phosphinic acids, a wide variety of surface characteristics can be achieved.

It should be noted that the free end of the phosphonic/phosphinic acid molecule may be further reacted after formation of the protective layer on the aluminum surface to provide the desired functionalization of the molecule discussed above if such functionalization of the phosphonic/phosphinic acid prior to treatment of the aluminum surface would interfere with such treatment or with the bond formed between the aluminum oxide layer formed during the treatment and the acid group of the phosphonic/phosphinic acid molecule. In this manner, chemical bonding of the phosphorus-containing acid group of the phosphonic/phosphinic acid molecule to the aluminum oxide surface can be assured.

To form the protective coating thereon, the aluminum surface should preferably, but not necessarily, first be cleaned to remove any contaminants or excess surface oxides using, for example, a mineral acid such as nitric, hydrochloride, or sulfuric acid, or a base such as NaOH, after which the surface is rinsed with water.

After the aluminum surface has been cleaned, it may be immersed in the hydroxylating liquid maintained at a temperature in the range of from just above freezing to just below boiling, preferably from about 50° C. to about 100° C.

The treatment with phosphonic or phosphinic acid provides a functionalized layer which is usually less than 1000Å thick and usually less than 200Å thick and greater than 5Å, with a typical thickness being in the range of about 30 to 100Å.

The result is an aluminum surface having a functionalized coating formed thereon and bonded to the aluminum surface comprising a first hydroxylated layer and a layer of phosphonic/phosphinic acid bonded to the aluminum hydroxide layer.

With respect to the bonding of the phosphonic/phosphinic acid molecule to the aluminum hydroxide surface, while we do not wish to be bound by any particular theory of bonding, a layer of phosphonic/phosphinic acid is formed or bonded uniformly to the hydroxyl layer.

The reaction is believed to be as follows:

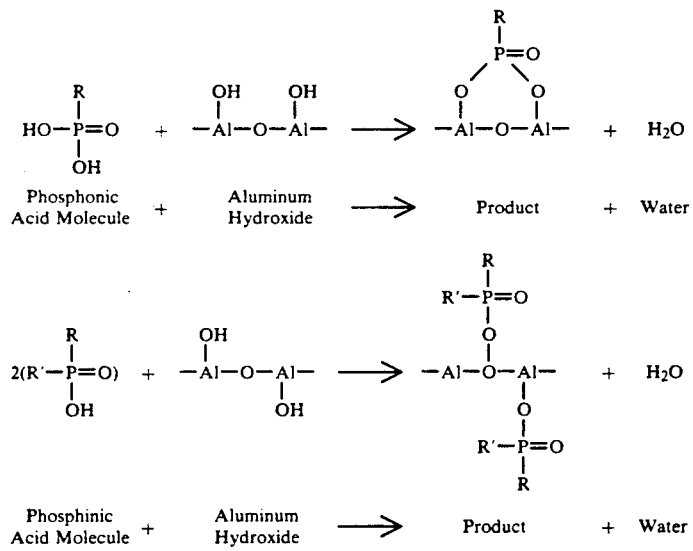

Figure 2:
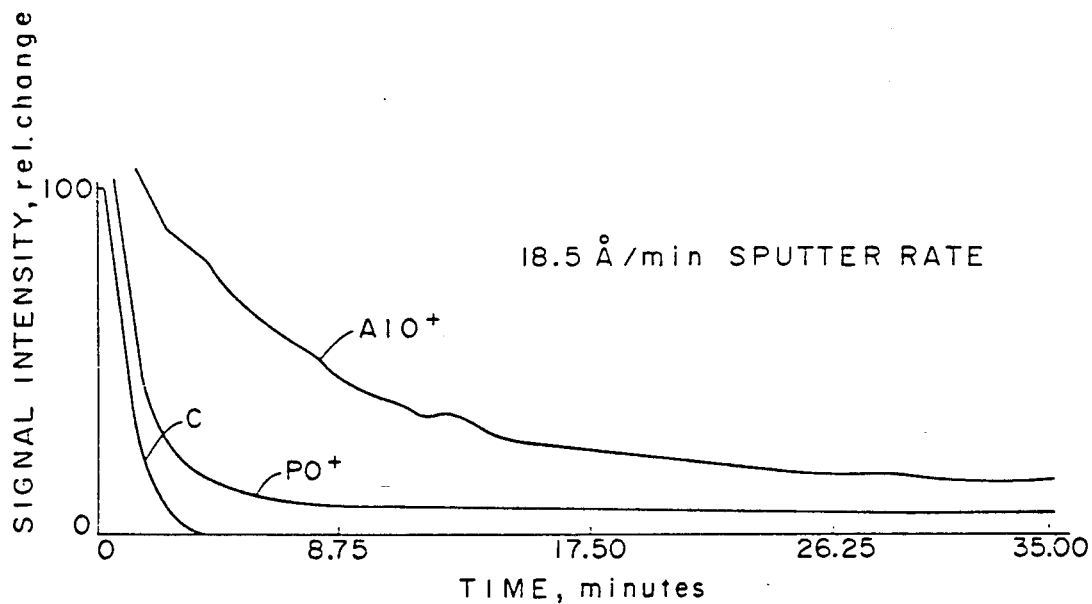
FIG. 2 is a depth profile analysis by AES confirming the duplex coating in accordance with the invention.

Examination of the layers of the subject invention by Electron Spectroscopy for Chemical Analysis (ESCA) shows a high ratio of aluminum to phosphorus. That is, aluminum can be about 6 to 30 times that of phosphorus. This shows that the acids are not incorporated into the oxide barrier layer but are bonded on the surface of the layer. That is, depth profiles by Secondary Ion Mass Spectroscopy (SIMS) of the duplex layer or coating formed in accordance with the subject invention using phenyl phosphonic acid (FIG. 2) shows the amount of carbon and phosphorus dropping very quickly in the first minutes of sputter etching. This shows that these elements (carbon and phosphorus) are on the surface.

The properties of the functionalized outermost layer may be controlled for specific applications. Properties such as wetting, chemical reactivity, polarity, hydrophobicity, hydrophilicity and thermal stability can affect the performance for the intended application. For example, a functionalized layer can be used for improved adhesive bonding of polymers. Adhesives which may be used for the functionalized layer include hot-melt adhesives such as polyethylene, other polyolefins or mixtures, ethylene-vinyl acetate copolymers, polyamides, polyesters, block copolymer rubbers; solution adhesive (water soluble) such as phenolics, amino resins, poly (vinyl methyl ether), poly (vinyl alcohol), dextrin; solution adhesives (organic solvent soluble) such as natural rubber and other elastomers, acrylics, polyurethanes, polyamides, phenoxies, poly (vinfyl acetals), polystyrenes; contact adhesives such as mixtures of chloroprene or nitrile rubber with oil-soluble phenolic, resins; aqueous dispersions such as acrylics, chloroprene, poly (vinyl acetate), polyurethanes, epoxies, silicones; activated adhesives such as dextrins, poly (vinyl alcohol), rubber, vinyl formal polymers, phenoxies, cellulosics, poly (vinyl chloride); film adhesives such as epoxies, phenolices, nitrile elastomer and blends thereof, polyamides, poly (vinyl butyral) poly (vinyl chloride), ehtylenecarboxylic acid copolymers; reactive polymers (thermosets) such as polyimide, polybenzimidazole, epoxies, phenolics, polyurethanes, cyanoacrylates, anaerobic acrylics; reactive polymers (electron beam or ultraviolet light) such as urea-formaldehyde, phenolics; pressure sensitive such as tackified elastomers, poly (alkyl acrylates), silicones.

The functionalized layer can provide an excellent surface for adhesion of: paints, primers, architectural paints such as organic solvent thinned paints, shellacs, cellulose derivatives, acrylic resins, vinyl resins, bitumens, and water thinned paints (latexes) such as copolymers of butandiene and styrene, polyvinyl acetate, acrylic resin; commercial finishes such as air-drying finishes such as epoxies, urethanes, polyester resins, alkyds, modified rubbers, and baking finishes such as acrylic resins, phenolic resins; industrial coatings such as corrosion resistant coatings, phenolic resins, chlorinated rubber, coal tar, epoxies, epoxies cured from a solvent solution with polyfunctional amines, polyamide resins, vinyl resin, elastomers, polyesters, and polyurethanes, and high temperature coatings such as silicone rubber, silicone resins, polyamides, TFE polymers; and immerision service coatings such as asphalt, thermoplastic coal tar, epoxy-furans, amine-cured epoxies, flurorocarbons, furfuryl alcohol resins, neoprene, bake unmodified phenolics, unsaturated polyesters, polyether resins, low-density polyethylene, chlorosulfonated polyethylene, polyvinyl chloride plastisols, resinous cements, rubber, urethanes.

Thus, it will be seen that metal surfaces can be modified by the use of the functionalized layer to achieve higher performance in all types of bonding.

Sheet stock produced in accordance with the present invention is suitable for use in can bodies or as end stock for easy open ends particularly when coated with a polymeric material. Such polymeric materials can be applied to the duplex coatings of the invention with resulting superior bond strengths, particularly if such polymeric coatings are bonded using reactive groups on the functionalized layer. Polymeric coatings which may be used as end stock are described in U.S. Pat. No. 3,832,962 incorporated herein by reference. The polymer coatings can be applied, for example, by spraying, dipping, roll coating, laminating, powder coating and then formed into containers.

Duplex layers in accordance with the invention were prepared as set forth in the following Examples.

EXAMPLE 1

AA5182 (max. 0.2 wt. % Si, max. 0.35 wt. % Fe, max. 0.15 wt. % Cu, 0.2–0.5 wt. % Mn, 4–5 wt. % Mg, max. 0.1 wt. % Cr, max. 0.25 wt. % Zn, max. 0.1 wt. % Ti, the remainder aluminum) alloy sheet, 0.25 millimeter thick, was cleaned by immersion in sodium carbonate solution, rinsed with water and then treated for 10 seconds in boiling water adjusted to pH 9 with triethanolamine. After rinsing with water, the sheet was immersed for another 10 seconds in a 1 molar solution of vinylphosphonic acid at room temperature. After rinsing and drying, the sheet was examined by SIMS depth profiling analysis and found to have a carbon/phosphorus layer over an aluminum oxide/hydroxide layer. Next, the sheet was coated with a solvent-based, epoxymodified polyvinylchloride coating. After curing of the polymer coating, the sheet was bent 180°, and the bent area was flattened by dropping a weight on it (impact bend test). The coating was examined after this test and given an adhesion rating of 5, i.e., the highest on a scale of 1–5.

EXAMPLE 2

AA5182 sheet was treated in the same manner as described in Example 1, except for the final treatment which was carried out in a 0.5 molar solution of hydrogen phosphonic acid. The coated sample was immersed in boiling water for 45 minutes, after which time the coating adhesion was tested by affixing an adhesive tape to the surface and pulling this tape off (process resistance tape test). No loss of adhesion was observed in this test.

EXAMPLE 3

Samples of AA3003 (max. 0.6 wt. % Si, max. 0.7 wt. % Fe, 0.05–0.2 wt. % Cu, 1–1.5 wt. % Mn, max. 0.1 wt. % Zn, the remainder aluminum), 0.13 millimeter thick foil were treated as in Example 1. One set of samples was coated with a polyvinyl chloride coating, a second one with an epoxy coating. After curing, the dry coatings were tested with the tape adhesion test. No failure was observed. The samples were then immersed for 45 minutes in boil water and tested by the tape ahesion test. Again, no failure was observed.

EXAMPLE 4

Samples having the treatements and coatings as in Example 3 were subjected to even more severe test procedures. That is, samples were subjected to a solution of lactic acid in water for 30 minutes at 175° C. (350° F.) or to a mixture of lard and water under the same time/temperature conditions. Tape tests after these treatments showed no loss of adhesion and visual inspection did not reveal blistering of the coating.

EXAMPLE 5

Three millimeter thick sheet of AA2024 T3 (max. 0.5 wt. % Si, max. 0.5 wt. % Fe, 3.8–4.9 wt. % Cu, 0.3–0.9 wt. % Mn, 1.2–1.8 wt. % Mg, max. 0.1 wt. % Cr, max. 0.25 wt. % Zn, max. 0.15 wt. % Ti, the remainder aluminum) was etched in a mixture of hydrofluoric and nitric acid, thoroughly rinsed with water then immersed for 30 seconds in a boiling solution of triethylamine at pH 9. After rinsing, a sample was immersed for 30 seconds at room temperature in a solution of 1 molar vinylphosphonic acid (VPA), another sample in 0.5 molar hydrogen phosphonic acid (HPA) and another sample in a 1:1 mixture of these solutions. After rinsing and drying, the sheet samples were adhesively bonded to each other with an epoxy film adhesive. The bonded samples were then subjected to the wedge test, ASTM D3762-79, and the lap shear test D1002, respectively. The results are graphically displayed in FIG. 3. Also shown are the results of a sample of 2024 T3 anodized according to Boeing Co. specification BAC5555, for 20 minutes in phosphoric acid. Lap shear test data are summarized in Table 1.

TABLE 1

| Lap Shear Test ASTM D1002 | | |
|---|---|---|
| | Average Strength (psi) | Average Strength (MPa) |
| BAC 5555* | 4678 | 32.25 |
| 0.5 mol. HPA** | 5344 | 36.85 |
| 1.0 mol VPA*** | 5344 | 36.85 |
| HPA/VPA 1:1 | 5012 | 34.56 |

*20 min. anodizing in phosphoric acid
**Hydrogen Phosphoric Acid
***Vinyl Phosphonic Acid Thus, the invention provides a process for forming a protective coating on a metal surface comprising a first layer of a metal hydroxide and a layer of phosphonic/phosphinic acid chemically bonded to the metal hydroxide layer.

Having thus described the invention, what is claimed is:

1. A layered material comprised of:
   (a) a base layer of aluminum alloy; and
   (b) a duplex layer comprised of:
      (i) an intermediate layer consisting essentially of an aluminum hydroxide layer attached to said base layer; and
      (ii) a functionalized layer comprised of the reaction product of phosphonic or phosphinic acid and aluminum hydroxide and the phosphonic acid having the formula $R_m[PO(OH)_2]_n$ wherein R may be hydrogen or is one or more radicals having a total of 1-30 carbons; m is the number of radicals in the molecule and is in the range of 1-10; n is the number of phosphonic acid groups in the molecule and is in the range of 1-10, and the phosphinic acid having the formula $R_mR'_o[PO(OH)]_n$ wherein R may be hydrogen of is one or more radicals having a total of 1-30 carbons; m is the number of R radicals in the molecule and is in the range of 1-10; R' may be hydrogen or may be comprised of 1-30 carbon-containing radicals; o is the number of R' radicals and is in the range of 1-10; n is the number of phosphinic acid groups in the molecule and is in the range of 1-10.

2. The layered material in accordance with claim 1 wherein said functionalized layer has a thickness of less than 200 Å.

3. The layered material in accordance with claim 1 wherein said functionalized layer has a thickness of less than 100 Å.

4. The layered material in accordance with claim 1 wherein said functionalized layer has a thickness of 5 to 50 Å.

5. The layered material in accordance with claim 1 wherein the aluminum hydroxide layer has a thickness less than 5000 Å.

6. The layered material in accordance with claim 1 wherein the aluminum hydroxide layer has a thickness less than 1000 Å.

7. The layered material in accordance with claim 1 wherein the aluminum hydroxide layer has a thickness in the range of 100 to 850 Å.

8. The layered material in accordance with claim 1 wherein the aluminum hydroxide results from a treatment in an aqueous solution containing triethanol amine at a pH in the range of 2 to 12.

9. The layered material in accordance with claim 1 wherein the alloy is selected from the group consisting of an alloy of at least 99 wt. % pure aluminum, an aluminum alloy containing 0.05-1.8 wt. % Mn, max. 1.3 wt. % Mg, and an aluminum alloy containing 0-1.4 wt. % Mn, 0.5-5.5 wt. % Mg.

10. The layered material in accordance with claim 9 wherein the alloy is selected from an aluminum alloy containing max. 0.2 wt. % Si, max. 0.35 wt. % Fe, max. 0.15 wt. % Cu, 0.2-0.5 wt. % Mn, 4-5 wt. % Mg, max. 0.1 wt. % Cr, max. 0.25 wt. % Zn, max. 0.1 wt. % Ti, the remainder aluminum, and an alloy containing max. 0.2 wt. % Si, max. 0.35 wt. % Fe, max. 0.15 wt. % Cu, 0.2-0.5 wt. % Mn, 3-4 wt. % Mg, max. 0.1 wt. % Cr, max. 0.25 wt. % Zn, max. 0.1 wt. % Ti, the remainder aluminum.

11. The layered material in accordance with claim 1 wherein the base layer is a sheet or foil product.

12. The layered material in accordance with claim 1 wherein the base layer is a sheet product selected from the group consisting of an alloy of at least 99 wt. % pure aluminum, an aluminum alloy containing 0.05-1.8 wt. % Mn, max. 1.3 wt. % Mg, and an aluminum alloy containing 0-1.4 wt. % Mn, 0.5-5.5 wt. % Mg.

13. The layered material in accordance with claim 12 wherein the base layer is foil stock fabricated from an aluminum alloy selected from the group consisting of an alloy of at least 99 wt. % pure aluminum, and an aluminum alloy containing 0.05-1.8 wt. % Mn, max. 1.3 wt. % Mg.

14. The layered material in accordance with claim 12 wherein the base layer is sheet stock fabricated from an aluminum alloy selected from max. 0.2 wt. % Si, max. 0.35 wt. % Fe, max. 0.15 wt. % Cu, 0.2-0.5 wt. % Mn, 4-5 wt. % Mg, max. 0.1 wt. % Cr, max. 0.25 wt. % Zn, max. 0.1 wt. % Ti, the remainder aluminum, and an alloy containing max. 0.2 wt. % Si, max. 0.35 wt. % Fe, max. 0.15 wt. % Cu, 0.2-0.5 wt. % Mn, 3-4 wt. % Mg, max. 0.1 wt. % Cr, max. 0.25 wt. % Zn, max. 0.1 wt. % Ti, the remainder aluminum.

15. Coated aluminum stock, the coating comprised of:
   (a) a layer of aluminum hydroxide bonded to a surface of said stock; and
   (b) a functionalized layer comprised of the reaction product of phosphonic or phosphinic acid and aluminum hydroxide, the phosphonic acid having the formula $R_m[PO(OH)_2]_n$ wherein R may be hydrogen or is one or more radicals having a total of 1-30 carbons; m is the number of radicals in the molecule and is in the range of 1-10; n is the number of phosphonic acid groups in the molecule and is in the range of 1-10, and the phosphinic acid having the formula $R_mR'_o[PO(OH)]_n$ wherein R may be hydrogen or is one or more radicals having a total of 1-30 carbons; m is the number of R radicals in the molecule and is in the range of 1-10; R' may be hydrogen or may be comprised of 1-30 carbon-containing radicals; o is the number of R' radicals and is in the range of 1-10; n is the number of phosphinic acid groups in the molecule and is in the range of 1-10.

16. The coated aluminum stock in accordance with claim 15 wherein said functionalized layer has a thickness of less than 200 Å.

17. The coated aluminum stock in accordance with claim 15 wherein said functionalized layer has a thickness of less than 100 Å.

18. The coated aluminum stock in accordance with claim 15 wherein said functionalized layer has a thickness of less than 50 Å.

19. The coated aluminum stock in accordance with claim 15 wherein the aluminum substrate is sheet stock fabricated from an alloy selected from an aluminum alloy containing 0.05-1.8 wt. % Mn, max. 1.3 wt. % Mg, and an aluminum alloy containing 0-1.4 wt. % Mn, 0.5-5.5 wt. % Mg.

20. The coated aluminum stock in accordance with claim 19 wherein the sheet stock is selected from and formed into ends for beverage containers max. 0.2 wt. % Si, max. 0.35 wt. % Fe, max. 0.15 wt. % Cu, 0.2-0.5 wt. % Mn, 4-5 wt. % Mg, max. 0.1 wt. % Cr, max. 0.25 wt. % Zn, max. 0.1 wt. % Ti, the remainder aluminum, and an alloy containing max. 0.2 wt. % Si, max. 0.35 wt. % Fe, max. 0.15 wt. % Cu, 0.2-0.5 wt. % Mn, 3-4 wt. % Mg, max. 0.1 wt. % Cr, max. 0.25 wt. % Zn, max. 0.1 wt. % Ti, the remainder aluminum.

21. A layered material comprised of:
    (a) a base layer of a flat rolled aluminum alloy selected from the group consisting of an alloy of at least 99 wt. % pure aluminum, an aluminum alloy containing 0.05-1.8 wt. % Mn, max. 1.3 wt. % Mg, and an aluminum alloy containing 0-1.4 wt. % Mn, 0.5-5.5 wt. % Mg; and
    (b) a duplex layer comprised of:
        (i) an intermediate layer consisting essentially of a layer of aluminum hydroxide attached to said base layer and resulting from treatment of said base layer in an aqueous solution of an amine selected from triethanol amine, triethyl amine and propyl amineat a pH in the range of 8 to 10 at a temperature from room temperature to 100° C.; and
        (ii) a functionalized layer of an organic phosphorus-containing compound resulting from a treatment with a phosphorus-containing acid selected from phosphinic and phosphonic acid and chemically bonded to an aluminum hydroxide layer.

22. The layered material in accordance with claim 21 wherein the flat rolled product is a sheet or foil product.

23. The layered material in accordance with claim 21 wherein the base layer is sheet stock fabricated from an aluminum alloy selected from max. 0.2 wt. % Si, max. 0.35 wt. % Fe, max. 0.15 wt. % Cu, 0.2-0.5 wt. % Mn, 4-5 wt. % Mg, max. 0.1 wt. % Cr, max. 0.25 wt. % Zn, max. 0.1 wt. % Ti, the remainder aluminum, and an alloy containing max. 0.2 wt. % Si, max. 0.35 wt. % Fe, max. 0.15 wt. % Cu, 0.2-0.5 wt. % Mn, 3-4 wt. % Mg, max. 0.1 wt. % Cr, max. 0.25 wt. % Zn, max. 0.1 wt. % Ti, the remainder aluminum.

24. Coated aluminum sheet and foil stock suitable for food and beverage container ends, the coating on said stock comprised of a layer of aluminum hydroxide thereon, said layer having chemically bonded thereto a functionalized layer comprised of the reaction product of phosphonic or phosphinic acid and aluminum hydroxide, the phosphonic acid having the formula $R_m[PO(OH)_2]_n$ wherein R may be hydrogen or is one or more radicals having a total of 1-30 carbons; m is the number of radicals in the molecule and is in the range of 1-10; n is the number of phosphonic acid groups in the molecule and is in the range of 1-10 and the phosphinic acid having the formula $R_mR'_o[PO(OH)]_n$ wherein R may be hydrogen or is one or more radicals having a total of 1-30 carbons; m is the number of R radicals in the molecule and is in the range of 1-10; R' may be hydrogen or may be comprised of 1-30 carbon-containing radicals; o is the number of R' radicals and is in the range of 1-10; n is the number of phosphinic acid groups in the molecule and is in the range of 1-10.

25. The coated aluminum stock in accordance with claim 24 wherein the functionalized layer is comprised of the reaction product of hydrogen phosphonic acid with aluminum hydroxide.

26. The layered material in accordance with claim 21 wherein the alloy is selected from the group consisting of an alloy of at least 99 wt. % pure aluminum, an aluminum alloy containing 0.05-1.8 wt. % Mn, max. 1.3 wt. % Mg, and an aluminum alloy containing 0-1.4 wt. % Mn, 0.5-5.5 wt. % Mg.

27. The layered material in accordance with claim 26 wherein the base layer is foil stock fabricated from an aluminum alloy selected from the group consisting of an alloy of at least 99 wt. % pure aluminum, and an aluminum alloy containing 0.05-1.8 wt. % Mn, max. 1.3 wt. % Mg.

28. The coated aluminum stock in accordance with claim 24 wherein said functionalized layer has a thickness of less than 200 Å.

29. The coated aluminum stock in accordance with claim 24 wherein said functionalized layer has a thickness of less than 100 Å.

30. The coated aluminum stock in accordance with claim 24 wherein said layer of aluminum hydroxide has a thickness less than 5000 Å.

31. The coated aluminum stock in accordance with claim 24 wherein said layer of aluminum hydroxide has a thickness less than 1000 Å.

32. The coated aluminum stock in accordance with claim 24 wherein said layer of aluminum hydroxide has a thickness in the range of 100 to 850 Å.

33. The coated aluminum stock in accordance with claim 24 wherein said functionalized layer has a thickness of less than 30 Å.

* * * * *

UNITED STATES PATENT AND TRADEMARK OFFICE
CERTIFICATE OF CORRECTION

PATENT NO. : 5,132,181

DATED : July 21, 1992

INVENTOR(S) : Karl Wefers, Gary A. Nitowski and Larry F. Wieserman

It is certified that error appears in the above-identified patent and that said Letters Patent is hereby corrected as shown below:

Col. 11, line 42   Change "amineat" to --amine at--.

Col. 11, line 50   After "layer", insert --;the phosphonic acid having the formula $R_m[PO(OH)_2]_n$ wherein R may be hydrogen or is one or more radicals having a total of 1-30 carbons; m is the number of radicals in the molecule and is in the range of 1-10; n is the number of phosphonic acid groups in the molecule and is in the range of 1-10 and the phosphinic acid having the formula $R_m R'_o [PO(OH)]_n$ wherein R may be hydrogen or is one or more radicals having a total of 1-30 carbons; m is the number of R radicals in the molecule and is in the range of 1-10; R' may be hydrogen or may be comprised of 1-30 carbon-containing radicals; o is the number of R' radicals and is in the range of 1-10; n is the number of phosphinic acid groups in the molecule and is in the range of 1-10--.

Signed and Sealed this

Fourteenth Day of December, 1993

Attest:

BRUCE LEHMAN

Attesting Officer       Commissioner of Patents and Trademarks